United States Patent
Sugimoto et al.

(10) Patent No.: US 6,540,259 B2
(45) Date of Patent: Apr. 1, 2003

(54) SHOCK ABSORBING STRUCTURE

(75) Inventors: Tadashi Sugimoto, Toyama (JP);
Masayoshi Takahashi, Himi (JP);
Satoshi Murakami, Toyama-ken (JP)

(73) Assignee: Aisin Keikinzoku Kabushiki Kaisha, Shinminato (JP)

( * ) Notice: Subject to any disclaimer, the term of this patent is extended or adjusted under 35 U.S.C. 154(b) by 50 days.

(21) Appl. No.: 09/805,129

(22) Filed: Mar. 14, 2001

(65) Prior Publication Data

US 2002/0109343 A1 Aug. 15, 2002

(30) Foreign Application Priority Data

Feb. 14, 2001 (JP) ........................................ 2001-036913

(51) Int. Cl.$^7$ .............................................. B60R 21/04
(52) U.S. Cl. ...................................... 280/751; 296/189
(58) Field of Search ................................. 280/751, 752, 280/748; 188/371, 377; 296/189, 39.1, 146.6

(56) References Cited

U.S. PATENT DOCUMENTS

| 5,163,730 | A | * | 11/1992 | Welch | ........................ 296/189 |
| 5,575,500 | A | * | 11/1996 | Mimura et al. | .............. 280/751 |
| 5,800,008 | A | * | 9/1998 | Gondo | ........................ 280/751 |
| 6,095,593 | A | * | 8/2000 | Johann et al. | .............. 296/189 |
| 6,170,872 | B1 | * | 1/2001 | Bair et al. | .................... 280/751 |
| 6,340,203 | B2 | * | 1/2002 | Enomoto et al. | ....... 296/203.02 |
| 6,390,539 | B2 | * | 5/2002 | Takahara | .................... 296/189 |

FOREIGN PATENT DOCUMENTS

JP    2000-85503    3/2000

* cited by examiner

Primary Examiner—Paul N. Dickson
Assistant Examiner—David R. Dunn
(74) Attorney, Agent, or Firm—Burns, Doane, Swecker & Mathis, LLP

(57) ABSTRACT

A shock absorber is accommodated in a space defined between an inner panel and a garnish panel of a vehicle to absorb secondary collision between the vehicle and a passenger. The shock absorber includes a hollow main body and a projection that protrudes outward or inward. When receiving shock by a passenger occupying a driver's seat, the shock absorber is deformed to fold the projection. When receiving shock by a passenger occupying a passenger seat that is located next to the driver's seat, the shock absorber is deformed to unfold the projection.

14 Claims, 5 Drawing Sheets

Direction D

Direction P

Direction D

Direction P

SHOCK ABSORBING STRUCTURE

BACKGROUND OF THE INVENTION

The present invention relates to a shock absorbing structure for protecting a driver and passengers from secondary collisions when a vehicle collides with something. More particularly, the present invention pertains to a shock absorbing structure that includes a shock absorber between an outer panel and a garnish panel of a vehicle.

When a vehicle collides with something, two measures, or primary and secondary measures, are taken to protect passengers. The primary measure refers to a structure for permitting the vehicle body to directly absorb shock. The secondary measure refers to a structure for preventing a driver and passengers from being injured when they hit something in the passenger compartment due to the collision.

A shock absorbing structure of the second measure preferably absorbs a great shock with a small deformation while suppressing the load applied to the driver or the passengers lower than a predetermined level. Japanese Unexamined Patent Publication No. 2000-85503 discloses a shock absorbing structure. The structure of the publication includes a hollow shock absorber that has a predetermined cross section. The shock absorber is located in a shock absorbing space, which is defined between an inner panel that forms an pillar and a garnish that covers the pillar.

The shock absorbing structure of the publication effectively absorbs a shock applied along a predetermined single direction. Specifically, if a driver on the driver's seat the pillar at the driver's seat, the shock is effectively absorbed. However, if a passenger on the other front seat hits the pillar at the driver's seat, the shock may not be effectively absorbed because the direction of the load is different from the predetermine direction. Also, if the driver hits the pillar at the other front seat, the shock is not effectively absorbed.

FIG. 4 is a graph showing the relationships between load and deformation of shock absorbing structures. The relationships of the graph were obtained through simulations. Double-dashed line represents a case of a prior art structure where a passenger on the front passenger seat hits the pillar at the driver's seat of a vehicle. In this case, shock is not effectively absorbed.

SUMMARY OF THE INVENTION

Accordingly, it Is an objective of the present invention to provide a shock absorbing structure that effectively absorbs shocks along two directions to prevent a driver and passengers from being injured.

To achieve the foregoing and other objectives and in accordance with the purpose of the present invention, a shock absorbing structure having a shock absorber that is accommodated in a space defined between an inner panel and a garnish panel of a vehicle to absorb shock due to a secondary collision between the vehicle and a passenger is provided. The shock absorber includes a hollow main body, a plurality of walls that form the main body and a projection that protrudes outward or inward. When receiving shock along a first direction, the shock absorber is deformed to fold the projection. When receiving shock along a second direction, the shock absorber is deformed to unfold the projection.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to FIGS. 1 to 4.

Figure 1:
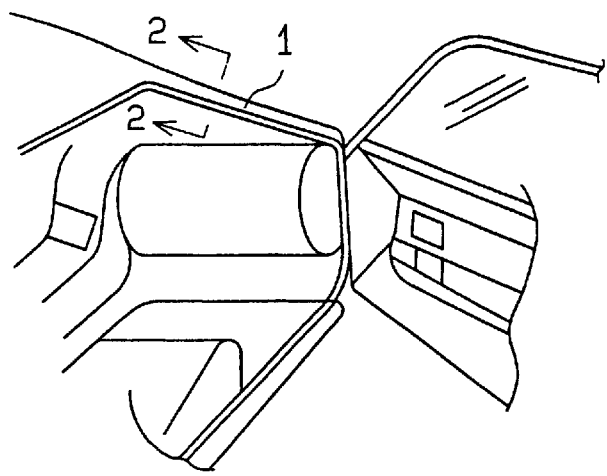
FIG. 1 is a perspective view illustrating a front pillar according to a first embodiment of the present invention.
Figure 2:
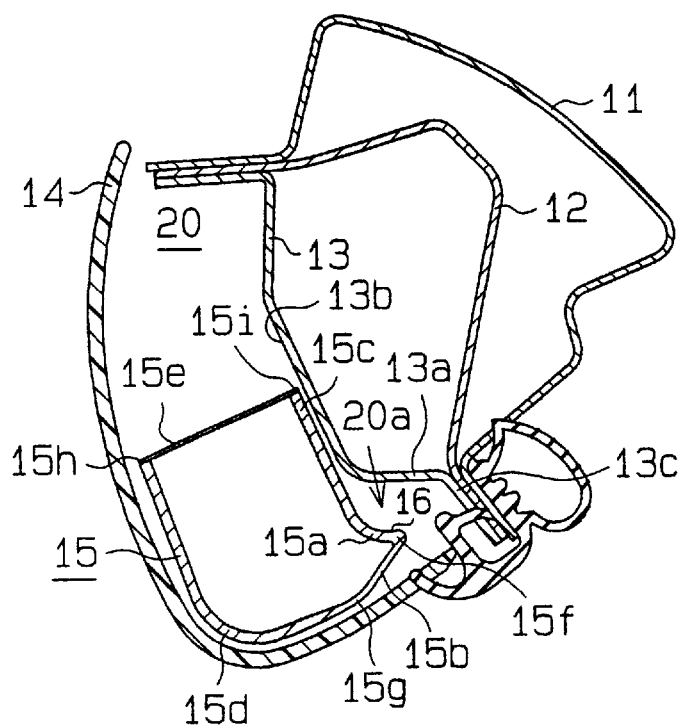
FIG. 2 is a cross-sectional view taken along line 2—2 of FIG. 1.

FIG. 1 illustrates a driver's compartment, in which a steering wheel (not shown) is located. As shown in FIGS. 1 and 2, a front pillar 1 at the driver's compartment includes an outer panel 11, first and second inner panels 12, 13, a garnish panel 14 and a hollow shock absorber 15.

The outer panel 11 protrudes outward. The first inner panel 12 protrudes into the interior of the outer panel 11. The second inner panel 13 is located in the interior of the first inner panel 12. The second inner panel 13 has an inclined portion 13a and a flat portion 13b in its center.

The garnish panel 14 is made of, for example, resin and covers the open ends of the panels 11–13. A shock absorbing space, which is a space 20 in this embodiment, is defined between the second inner panel 13 and the garnish panel 14. The space 20 includes a redundant space 20a, which is located in the vicinity of the inclined portion 13a and a flange 13c of the second inner panel 13.

The shock absorber 15 is made of, for example, aluminum, and is formed by extrusion molding. The shock absorber 15 is accommodated in the space 20 and includes a projection 16. When the shock absorber 15 absorbs shock, the space 20 can be deformed. The shock absorber 15 is fastened to the second inner panel 13 through the flat portion 13b. Alternatively, the shock absorber 15 may be glued to the garnish panel 14 with adhesive.

The projection 16 has a V-shaped cross section and protrudes into the redundant space 20a toward the flange 13c. The projection 16 has a first wall 15a and a second wall 15b. The walls 15a, 15b are located at a part that receives load due to a secondary collision so that the shock is effectively absorbed.

Figure 3A:
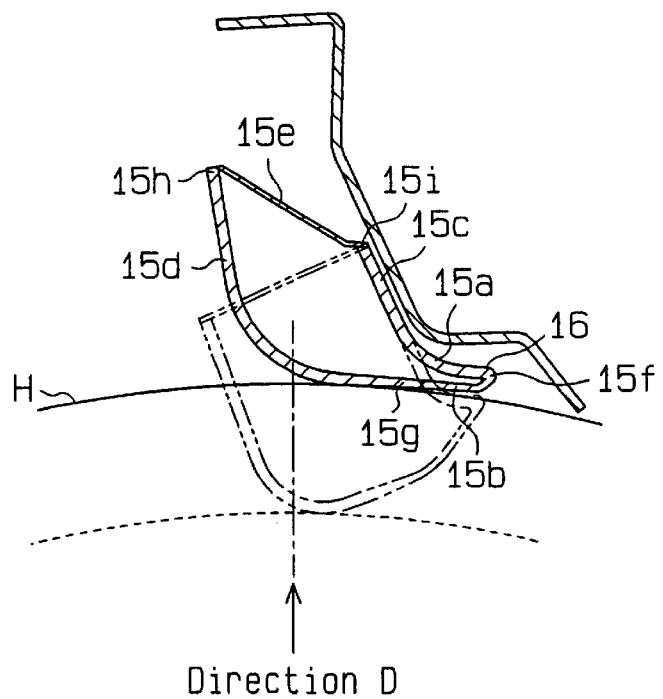
FIGS. 3(a) and 3(b) are cross-sectional views showing the operation of the structure shown in FIG. 1.
Figure 3B:
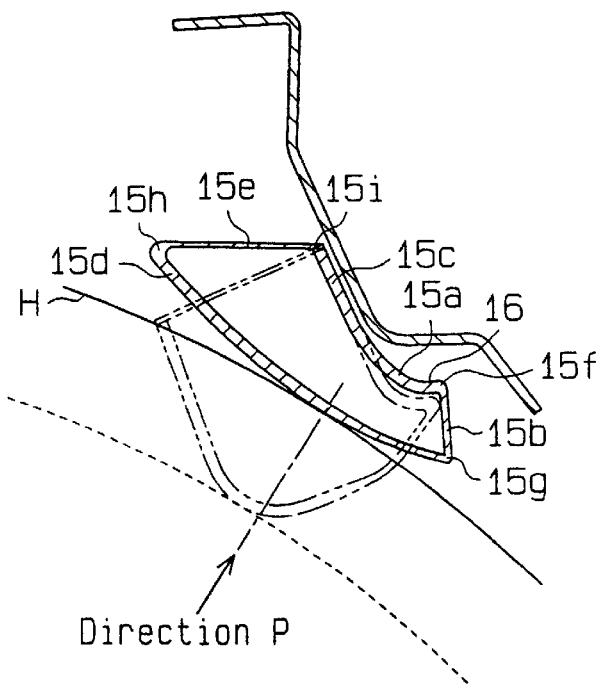

FIGS. 3(a) and 3(b) illustrate cases when the shock absorber 15 absorbs shock due to a collision A wall of the body 15 that extends from the first wall 15a and along the second inner panel 13 will be referred to as a third wall 15c. A wall that extends from the second wall 15b and along the garnish panel 14 will be referred to as a fourth wall 15d. A wall that couples the third wall 15c and the fourth wall 15d to each other will be referred to as a fifth wall 15e. The vertex between the first and second walls 15a, 15b will be referred to as a first vertex 15f. The vertex between the second and fourth walls 15b, 15d will be referred to as a second vertex 15g. The vertex between the fourth and fifth walls 15d, 15e will be referred to as a third vertex 15h. The vertex between the third and fifth walls 15c, 15e will be referred to as a fourth vertex 15i.

FIG. 3(a) shows a case where the head H of a driver collides with the front pillar 1 along the direction of arrow D. First, the fourth wall 15d of the shock absorber 15 is deformed. Then, the fourth and fifth walls 15d, 15e are folded about the third vertex 15h, and the third and fifth walls 15c, 15e are unfolded about the fourth vertex 15i. Accordingly, the first and second walls 15a, 15b are folded about the first vertex 15f so that the projection 16 collapses. At this time, the second and fourth walls 15b, 15d are unfolded about the second vertex 15g.

Figure 4:
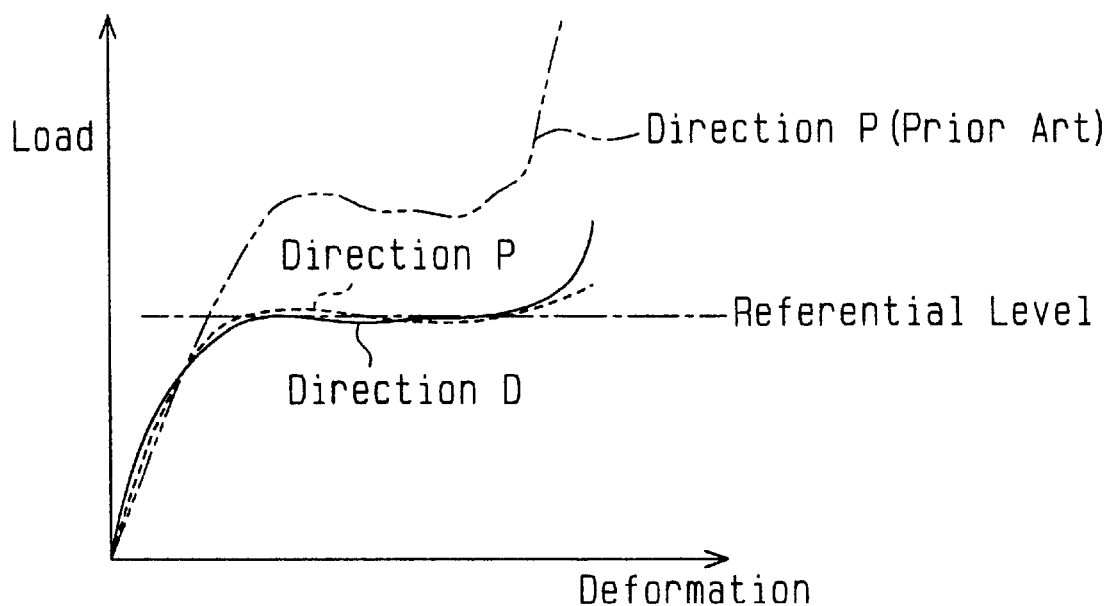
FIG. 4 is a graph showing the relationship between load and deformation of the structure shown in FIG. 1.

The graph of FIG. 4 shows the results of simulations. Specifically, the graph shows the relationship between load and deformation of the front pillar 1. Solid line shows a case when load is applied along the direction of arrow D in FIG. 3(a). The load of the direction D is absorbed in an ideal manner. Dashed line that is parallel to the horizontal axis of the graph represents a referential level of load applied to a passenger or a driver. Shock is effectively absorbed in the embodiment of FIGS. 1 to 4. Therefore, even if the front pillar 1 is relatively greatly deformed, the load acting on a driver or a passenger scarcely surpasses the referential level, which improves the safety of a driver and a passenger.

FIG. 3(b) shows a case when the head H of a passenger from the front passenger seat collides with the front pillar 1. This secondary collision may occur when the vehicle is hit by another vehicle from a side. First, the fourth wall 15d of the shock absorber 15 is deformed by the collision with the head H. Subsequently, the fourth and fifth walls 15d, 15e are folded about the third vertex 15h, and the third and fifth walls 15c, 15e are unfolded about the fourth vertex 15i. Then, the first and second walls 15a, 15b are unfolded about the first vertex 15f, which opens the projection 16. Also, the second and fourth walls 15b, 15d are folded about the second vertex 15g.

Accordingly, as shown by broken line in FIG. 4, the front pillar 1 of the embodiment shown in FIGS. 1 to 4 absorbs load along the direction of arrow P in an ideal manner.

The embodiment of FIGS. 1 to 4 has the following advantages.

(1) The shock absorber 15 has the projection 16, which has a V-shaped cross section and protrudes outward, When a shock is applied by a driver, who occupies the driver's seat, along the direction of arrow i, the shock absorber 15 is deformed such that the projection 16 collapses, which effectively absorbs the shock. When a shock is applied by a passenger who occupies the front passenger seat along the direction of arrow P, the shock absorber 15 is deformed such that the projection 16 is opened, which effectively absorbs the shock. In this manner, the shock absorber 15 effectively absorbs shocks in two directions, or applied by the driver and load applied by the passenger, which prevents the passenger and the driver from being injured.

(2) The projection 16 is located in the redundant space 20a, which is located in the vicinity of the flange 13c of the second inner panel 13. Therefore, the projection 16 does not hinder the installation of the shock absorber 15.

It should be apparent to those skilled in the art that the present invention may be embodied in many other specific forms without departing from the spirit or scope of the invention. Particularly, it should be understood that the invention may be embodied in the following forms.

Figure 5:
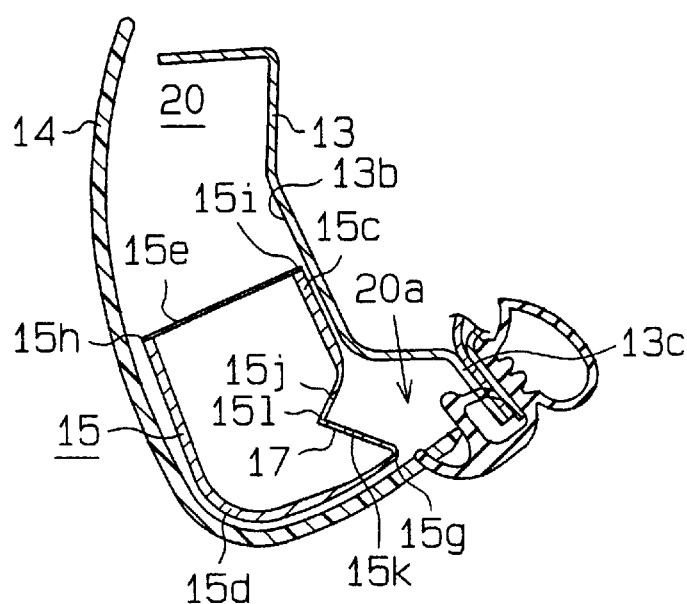
FIG. 5 is a cross-sectional view illustrating a second embodiment of the present invention.

The projection 16, which protrudes outward from the shock absorber 15, may be replaced by an inward projection 17 shown in FIG. 5. The inward projection 17 has a V-shaped cross section and has first and second walls 15j, 15k. The walls 15j, 15k define a first vertex 15l.

Figure 6A:
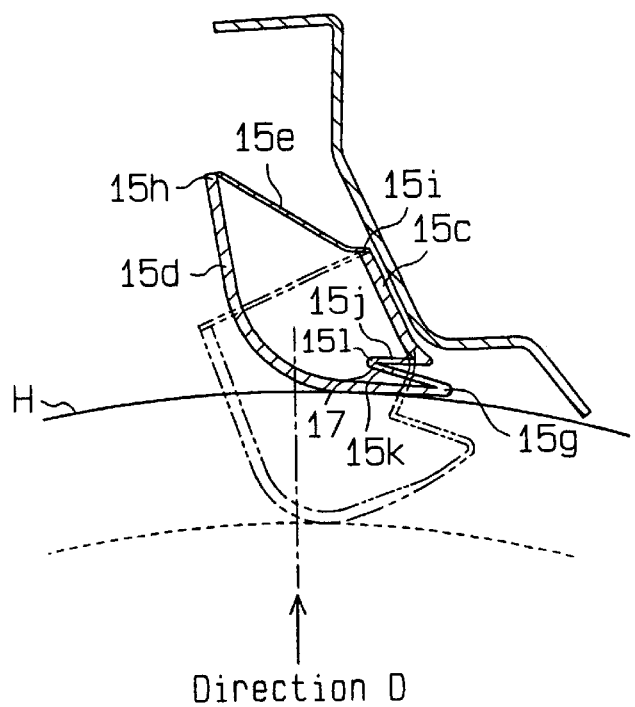
FIGS. 6(a) and 6(b) are cross-sectional views showing the operation of the structure shown in FIG. 5.

FIG. 6(a) shows a case where the head H of a driver collides with the front pillar 1, which has the shock absorber 15 of FIG. 5, along the direction of arrow D. First, the fourth wall 15d of the shock absorber 15 is deformed. Then, the fourth and fifth walls 15d, 15e are folded about the third vertex 15h, and the third and fifth walls 15c, 15e are unfolded about the fourth vertex 15i. Accordingly, the first and second walls 15j, 15k are folded about the first vertex 15l. At this time, the second and fourth wall 15k, 15d are folded about the second vertex 15g. Like the shock absorber 15 of FIGS. 1 to 4, the shock absorber 15 of FIG. 5 absorbs load along arrow D from the driver's seat in an ideal manner.

Figure 6B:
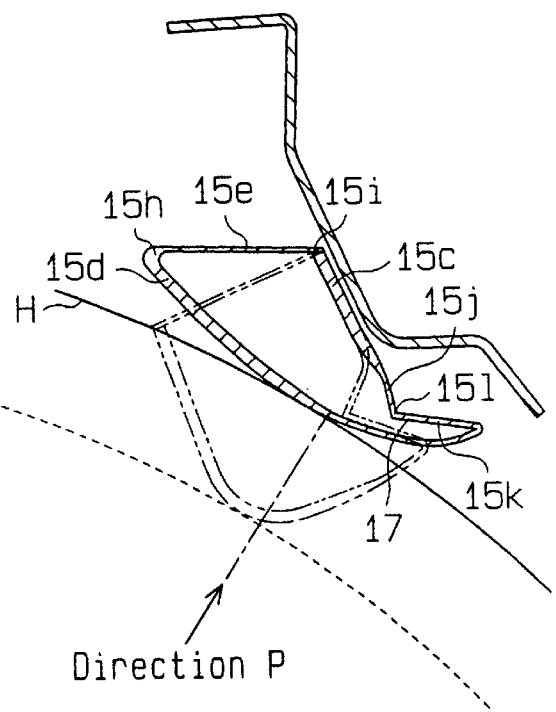

FIG. 6(b) shows a case when the head H of a passenger from the front passenger seat collides with the front pillar 1. First, the fourth wall 15d of the shock absorber 15 is deformed. Subsequently, the fourth and fifth walls 15d, 15e are folded about the third vertex 15h, and the third and fifth walls 15c, 15e are unfolded about the fourth vertex 15i. Then, the first and second walls 15j, 15k are unfolded about the first vertex 15l. Also, the second and fourth walls 15k, 15d are folded about the second vertex 15g. Therefore, like the shock absorber 15 of FIGS. 1 to 4, the shock absorber 15 of FIG. 5 absorbs load along arrow P in FIG. 6(b) from the front passenger seat in an ideal manner.

Figure 7:
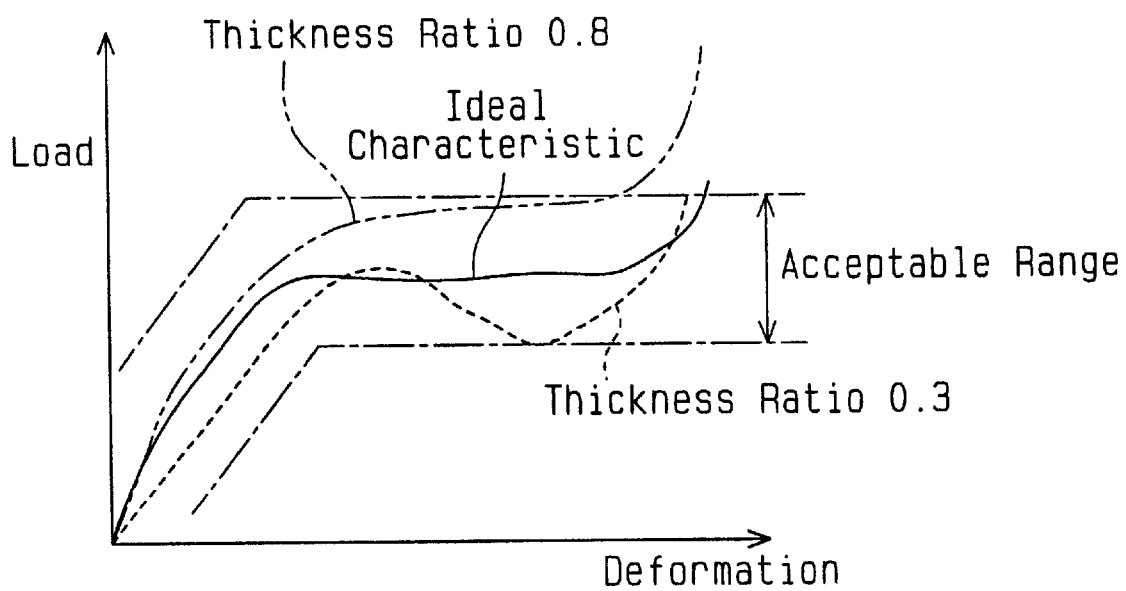
FIG. 7 is a graph showing the relationship between load and deformation of the structure shown in FIG. 5.

The value of load on the front pillar 1 for a given deformation is preferably in the acceptable range, which is shown by dashed lines in FIG. 7. Deformation of the projections 16, 17 can be promoted by making the first and second walls 15a, 15b, 15j, 15k thinner than the third to fifth walls 15c–15e. Promoted deformation of the first and second walls 15a, 15b, 15j, 15k permits applied shock to be absorbed in a more ideal manner. Specifically, it has been confirmed that the ideal characteristics of the pillar 1 are obtained by setting the ratio of thickness of the first and second walls 15a, 15b, 15j, 15k to the third to fifth walls 15c–15e at 0.3 to 0.8.

In the illustrated embodiments, the present invention is applied to the front pillar 1 at the driver's seat. The shock absorber 15 may be installed in the front pillar at the front passenger seat. In this case, the same advantages as the illustrated embodiments are obtained.

In the illustrated embodiments, the first and second walls 15a, 15b, 15j, 15k are arranged at a part that directly receives load to countermeasure secondary collisions. However, as long as the same advantages are obtained, the first and second walls 15a, 15b, 15j, 15k may be arranged elsewhere.

In each of the illustrated embodiments, the shock absorber 15 has one projection 16, 17. However, the shock absorber 15 may have two or more projections.

In the illustrated embodiment, the present invention is applied to the front pillar 1. However, the present invention may be applied to a center pillar, a rear pillar or a roof side rail.

Therefore, the present examples and embodiments are to be considered as illustrative and not restrictive and the invention is not to be limited to the details given herein, but may be modified within the scope and equivalence of the appended claims.

What is claimed is:

1. A shock absorbing structure having a shock absorber that is accommodated in a space defined between an inner panel and a garnish panel of a vehicle be to absorb shock due to a secondary collision between the vehicle and a passenger, and wherein the shock absorber comprises:

a hollow main body;

a plurality of walls that form the main body; and a projection that protrudes outward or inward, the projection possessing a V-shaped cross-section, wherein, when receiving shock along a first direction, the shock absorber is deformed to fold the projection, and wherein, when receiving shock along a second direction, the shock absorber is deformed to unfold the projection, the inner panel including a flange that is curbed outward, and the projection being located in the vicinity of the flange.

2. The shock absorbing structure according to claim 1, wherein the projection has a first wall and a second wall which together form the V-shaped cross-section, and the main body has a third wall, a fourth wall, a fifth wall, and wherein the first wall is coupled to the third wall and the second wall is coupled to the fourth wall.

3. The shock absorbing structure according to claim 2, wherein the second and fourth walls are arranged along the garnish panel, and wherein the first and third walls are arranged along the inner panel.

4. The shock absorbing structure according to claim 2, wherein the first and second walls are thinner than the third, fourth and fifth walls.

5. The shock absorbing structure according to claim 4, wherein the ratio of thickness of the first and second walls to the third, fourth and fifth walls is from 0.3 to 0.8.

6. The shock absorbing structure according to claim 1, wherein the main body is fixed to one of the inner panel and the garnish panel.

7. The shock absorbing structure according to claim 1, wherein the projection projects outward and toward the flange.

8. A shock absorbing structure installed in a vehicle that has a driver's seat and a passenger seat located next to the driver's seat, wherein the shock absorbing structure has a shock absorber that is accommodated in a space defined between an inner panel and a garnish panel to absorb shock due to a secondary collision between the vehicle and a passenger, and wherein the shock absorber comprises:

a hollow main body;

a plurality of walls that form the main body; and a projection that protrudes outward or inward, the projection possessing a V-shaped cross-section, wherein, when receiving shock by a passenger occupying the driver's seat, the shock absorber is deformed to fold the projection, and wherein, when receiving shock by a passenger occupying the passenger seat, the shock absorber is deformed to unfold the projection, the inner panel including a flange that is curved outwardly, and the projection being located in the vicinity of the flange.

9. The shock absorbing structure according to claim 8, wherein the projection has a first wall and a second wall which together form the V-shaped cross-section, and the main body has a third wall, a fourth wall, a fifth wall, and wherein the first wall is coupled to the third wall and the second wall is coupled to the fourth wall, the third wall and the second wall is coupled to the fourth wall.

10. The shock absorbing structure according to claim 9, wherein the second and fourth walls are arranged along the garnish panel, and wherein the first and third walls are arranged along the inner panel.

11. The shock absorbing structure according to claim 9, wherein the first and second walls are thinner than the third, fourth and fifth walls.

12. The shock absorbing structure according to claim 11, wherein the ratio of thickness of the first and second walls to the third, fourth and fifth walls is from 0.3 to 0.8.

13. The shock absorbing structure according to claim 8, wherein the main body is fixed to one of the inner panel and the garnish panel.

14. The shock absorbing structure according to claim 8, wherein the projection projects outward and toward the flange.

* * * * *